US011200625B2

(12) United States Patent
Albouyeh et al.

(10) Patent No.: US 11,200,625 B2
(45) Date of Patent: Dec. 14, 2021

(54) DYNAMIC MODIFICATION OF USER SKILL PROFILE USING DETERMINED CROWDSOURCED SOCIAL PRESENCE

(71) Applicant: International Business Machines Corporation, Armonk, NY (US)

(72) Inventors: Shadi Albouyeh, Raleigh, NC (US); Trudy L. Hewitt, Cary, NC (US); Kelley Anders, East New Market, MD (US); Jonathan Dunne, County Waterford (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 351 days.

(21) Appl. No.: 16/100,494

(22) Filed: Aug. 10, 2018

(65) Prior Publication Data
US 2020/0051178 A1   Feb. 13, 2020

(51) Int. Cl.
*G06Q 50/00* (2012.01)
*G06F 40/30* (2020.01)
*H04L 29/08* (2006.01)

(52) U.S. Cl.
CPC .............. *G06Q 50/01* (2013.01); *G06F 40/30* (2020.01); *H04L 67/306* (2013.01)

(58) Field of Classification Search
CPC .... G06Q 50/01; G06Q 10/1053; G06F 40/30; H04L 67/306; G06N 5/022; G06N 20/00; G06N 7/005
See application file for complete search history.

(56) References Cited

U.S. PATENT DOCUMENTS

2010/0280985 A1\* 11/2010 Duchon ................. G06Q 10/10
706/52
2011/0238591 A1    9/2011 Kerr et al.
2012/0023030 A1    1/2012 James
(Continued)

FOREIGN PATENT DOCUMENTS

WO        2017098342 A1    6/2017

OTHER PUBLICATIONS

Rayson, Paul, and Roger Garside. "Comparing corpora using frequency profiling." The workshop on comparing corpora. 2000. (Year: 2000).\*

(Continued)

*Primary Examiner* — Richard W. Crandall
*Assistant Examiner* — Corey Russ
(74) *Attorney, Agent, or Firm* — Garg Law Firm, PLLC; Rakesh Garg; Michael O'Keefe

(57) ABSTRACT

Modification of a user skill profile based upon social presence includes receiving a document indicating skill competencies of a user, and analyzing the document to determine a first model. The first model includes skill competencies indicated within the document. A social media profile associated with the user is received. The social media profile is analyzed to determine a second model. The second model includes current skills competencies of the user indicated by the social media profile. The first model and the second model is compared to determine missing skill competencies, the missing skill competencies including current skill competencies in the second model that are missing from the document. The document is modified to include the missing skill competencies.

16 Claims, 5 Drawing Sheets

(56) References Cited

U.S. PATENT DOCUMENTS

| | | | |
|---|---|---|---|
| 2014/0136933 A1* | 5/2014 | Berger | G06Q 50/01 715/202 |
| 2014/0278633 A1* | 9/2014 | Daly | G06Q 10/1053 705/7.14 |
| 2015/0317610 A1* | 11/2015 | Rao | G06Q 10/1053 705/321 |
| 2015/0356411 A1* | 12/2015 | Faith | G06N 20/00 706/46 |
| 2016/0005001 A1 | 1/2016 | Muhammedali et al. | |
| 2016/0098667 A1* | 4/2016 | Ryan | G06Q 10/063112 705/7.14 |
| 2016/0140503 A1* | 5/2016 | Jemiolo | G06Q 50/01 705/321 |
| 2016/0379170 A1* | 12/2016 | Pande | G06Q 10/1053 705/321 |
| 2017/0154308 A1* | 6/2017 | Duerr | G06F 16/9535 |
| 2017/0213179 A1* | 7/2017 | Schissel | G06Q 10/063112 |
| 2017/0270487 A1* | 9/2017 | Rennison | G06Q 50/2057 |
| 2018/0032615 A1* | 2/2018 | Wang | G06Q 50/01 |
| 2018/0268373 A1* | 9/2018 | Bheemavarapu | G06Q 10/1053 |
| 2018/0314756 A1* | 11/2018 | Wang | G06F 16/29 |
| 2019/0012307 A1* | 1/2019 | Ling | G06Q 50/01 |
| 2019/0087558 A1* | 3/2019 | Mercury | H04L 63/0861 |
| 2019/0138611 A1* | 5/2019 | Gines Marin | G06F 16/148 |
| 2019/0138637 A1* | 5/2019 | Hogan | G06Q 50/01 |

OTHER PUBLICATIONS

Chenni, Oualid, et al. "A content-based recommendation approach using semantic user profile in e-recruitment." International Conference on Theory and Practice of Natural Computing. Springer, Cham, 2015. (Year: 2015).*

Siting, Zheng, et al. "Job recommender systems: a survey." 2012 7th International Conference on Computer Science & Education (ICCSE). IEEE, 2012. (Year: 2012).*

Hong, Wenxing, Siting Zheng, and Huan Wang. "Dynamic user profile-based job recommender system." 2013 8th International Conference on Computer Science & Education. IEEE, 2013. (Year: 2013).*

* cited by examiner

DYNAMIC MODIFICATION OF USER SKILL PROFILE USING DETERMINED CROWDSOURCED SOCIAL PRESENCE

TECHNICAL FIELD

The present invention relates generally to a method, system, and computer program product for updating a user skill profile. More particularly, the present invention relates to a method, system, and computer program product for dynamic modification of a user skill profile using determined crowdsourced social presence.

BACKGROUND

A user skill profile represents a level of knowledge of a user regarding one or more topics and often includes core skills and competencies of the user with respect to the one or more topics. User skill profiles are often represented within a user skill profile document such as a resume or curriculum vitae (CV). A resume or a CV is a document used by a person to represent one or more of that person's background, job experience, education, skills, and competencies. The information in a resume/CV document is often organized within the document such that work experience, education, and skill are each grouped into respective sections of the document to improve readability. A resume or CV may be used for a variety of purposes such as applying for employment.

SUMMARY

The illustrative embodiments provide a method, system, and computer program product. An embodiment of a method for modification of a user skill profile based upon social presence includes receiving a document, the document indicating skill competencies of a user. The embodiment further includes analyzing the document to determine a first model. In the embodiment, the first model includes skill competencies indicated within the document. The embodiment further includes receiving a social media profile associated with the user, and analyzing the social media profile to determine a second model. In the embodiment, the second model includes current skills competencies of the user indicated by the social media profile. The embodiment further includes comparing the first model and the second model to determine missing skill competencies, the missing skill competencies including current skill competencies in the second model that are missing from the document. The embodiment further includes modifying the document to include the missing skill competencies.

In another embodiment, analyzing the document to determine the first model includes using natural language processing. In another embodiment, analyzing the document to determine the first model includes using a latent Dirichlet allocation (LDA) algorithm. In another embodiment, the social media profile is received from a social media platform.

Another embodiment further includes determining a social graph of the user from the social media profile, determining social graph attributes of the social graph, and determining the current skill competencies of the user based upon the social graph attributes. In another embodiment, the social graph attributes represent skills and/or competencies derived from relationships or interactions of the user with entities represented in the social graph.

In another embodiment, determining the missing skill competencies includes comparing maximum likelihood terms of the first model and the second model. In another embodiment, determining the missing skill competencies includes determining a model divergence between the first model and the second model. In another embodiment, determining the model divergence includes measuring divergence of a probability distribution of the first model from a probability distribution of the second model.

Another embodiment further includes providing a recommendation to the user perform a remedial action based upon the comparison.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
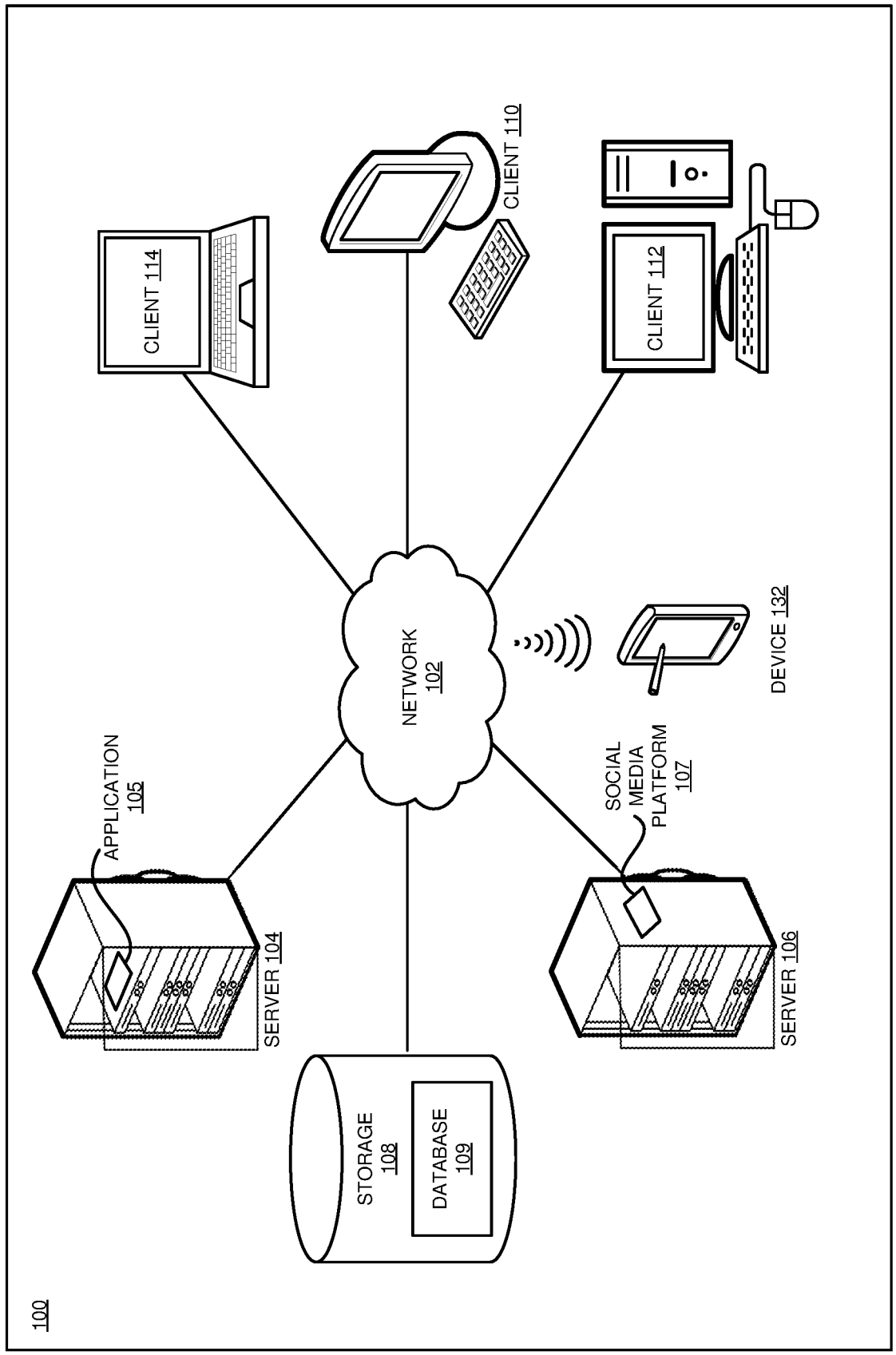
FIG. 1 depicts a block diagram of a network of data processing systems in which illustrative embodiments may be implemented.

The illustrative embodiments described herein are directed to dynamic modification of a user skill profile using determined crowdsourced social presence. Looking for a new job is a daunting task for many, especially for those who have been in the workforce for some time and have established careers but are now looking to make a drastic change. These individuals are often associated by past positions held, companies they have worked for, credentials and skills they have acquired, which can brand them in a certain way. In addition, an individual's social presence, or lack thereof, may limit the individual for consideration to positions that may be looking for specific traits and/or qualities that are evident from the individual's social profile.

A user's social presence (e.g., a social media presence) refers to a manner in which a user engages and participates with other users and/or group using one or more social media platforms such as Facebook™, Twitter™, LinkedIn™, Quora™, or StackExchange™/StackOverflow™. A user's social presence is presented by a social profile associated with the user.

One or more embodiments includes analyzing a document including a user's skill profile (e.g., a resume or CV) to determine a model of the core skills and competencies of the user, analyzing the user's social profile to derive a model of the user's skills and competencies obtained from the user's social profile, comparing the two models to determine discrepancies or differences between the models, and dynamically updating the user's skill profile based upon the determined differences to reflect new skills and competencies indicated by the social profile but not currently contained with the user's skill profile.

In an embodiment, an application residing on a server receives a user skill profile document (e.g., a resume or CV) and analyzes the document using a topic modelling algorithm to determine key skills and attributes indicated within the document. In one or more embodiments, the application performs topic modelling using natural language processing. In one or more embodiments, an unsupervised learning algorithm in used to perform topic modelling on the user skill profile document to group terms within the document by most likely occurrence.

In a particular embodiment, the topic-modelling algorithm is a latent Dirichlet allocation (LDA) algorithm. LDA is a generative statistical model of a collection of documents having parts made up by words and/or phrases. In a topic model algorithm such as LDA, each document may be viewed as a mixture of various topics in which each document is considered to have a set of topics that are assigned to it via LDA. LDA is similar to probabilistic latent semantic analysis (pLSA), except that in LDA the topic distribution is assumed to have a sparse Dirichlet prior. The sparse Dirichlet priors encode the intuition that documents cover only a small set of topics and that topics use only a small set of words frequently. In practice, this results in a better disambiguation of words and a more precise assignment of documents to topics. LDA is a generalization of the pLSA model, which is equivalent to LDA under a uniform Dirichlet prior distribution. In other words, the algorithm groups similar topic terms in groups. A typical bundle may contain ten terms, all of which are ranked by their log likelihood, from highest to lowest.

In the embodiment, the application receives the user's social profile from one or more social media platforms and analyzes the user's social profile and user profiles of individuals associated with the user on the one or more social media platforms to determine current skill competencies of the user. In one or more embodiments, the user's social profile includes a history of social media interactions of the user. In one or more embodiments, the application derives a social graph of the user, determines social graph attributes of the social graph, and determines current skills and competencies of the user based upon the social graph attributes. A social graph is a graph that depicts personal relations of users. In short, a social graph is a model or representation of a social network. The social graph has been referred to as "the global mapping of everybody and how they're related" for a social networking platform. Social graph attributes represent skills and/or competencies derived from relationships and interactions with the user and other individuals, groups and/or entities represented in the social graph.

Examples of social graph attributes may include, for example, content of posts made by the user, a language known by the user, an activity of the user, and/or an organization associated with the user.

In the embodiment, the application compares the resume/CV document topic model and the social graph skills/attributes for equivalency to determine social graph skills/attributes that are missing from the resume/CV document. In a particular embodiment, the application compares maximum likelihood terms of the resume/CB document topic model with social graph property terms to determine the missing skills/attributes.

In an embodiment, the application uses a supervised learning algorithm to provide a mechanism to infer topic models that provide high and low divergence. In one or more embodiments, the application uses the results of multiple iterations of model divergence sampling as a basis to train a supervised learning algorithm to classify two topic models as high/low divergence and then use the learning to classify models based on prior labelling.

In a particular embodiment, the application determines model divergence using a Kullback-Leibler (KL) divergence technique to measure divergence of a probability distribution of the first model based upon the user skills profile document from a probability distribution of the second model based upon the user's social media presence. The KL divergence is calculated as a log difference between the probability distribution of data in the first model with the probability distribution of data in the second model.

In the embodiment, the application performs one or more remedial actions based upon the determined missing skills. In one embodiment, the application modifies the user skills profile document by updating the document with the missing skills/attributes. In a particular embodiment, the application is configured to push minor changes to an online repository including the user's skill profile using an application programming interface (API). In another embodiment, for more substantial differences, the application provides a recommendation to perform one or more other remedial actions to the user based upon model convergence or divergence such as suggesting upgrading of a particular skill or competency via further instruction such as providing online course materials. In another embodiment, the application may recommend to the user to apply for a new employment opportunity for which the user may be suited.

In another embodiment, the application is configured to modify another document instead of a user skills profile document such as transforming a presentation for a specific need or audience. For instance, someone not in the field of medicine may be required to devise a presentation for the medical community which currently can be a manual process in which research is required. In the example, the application uses social presence of members of the target audience to determine the type of content, presentation style, verbiage, and other factors necessary in order to communicate effectively with the target audience and updates the presentation accordingly. Although various embodiments are described with respect to user skills profile documents such as resumes and CVs, it should be understood that in other embodiments the principles described herein may be applied to any skills based medium such as a user profile or user contacts.

One or more embodiments provide for improved performance of user skill profile modification and social media network data processing systems by dynamic modification of a user skill profile using crowdsourced social presence of the user. In one or more embodiments, the system integrates with existing social media platforms.

An embodiment can be implemented as a software application. The application implementing an embodiment can be configured as a modification of an existing social media system or platform, as a separate application that operates in conjunction with an existing social media system or platform, a standalone application, or some combination thereof.

The illustrative embodiments are described with respect to certain types of tools and platforms, procedures and algorithms, services, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
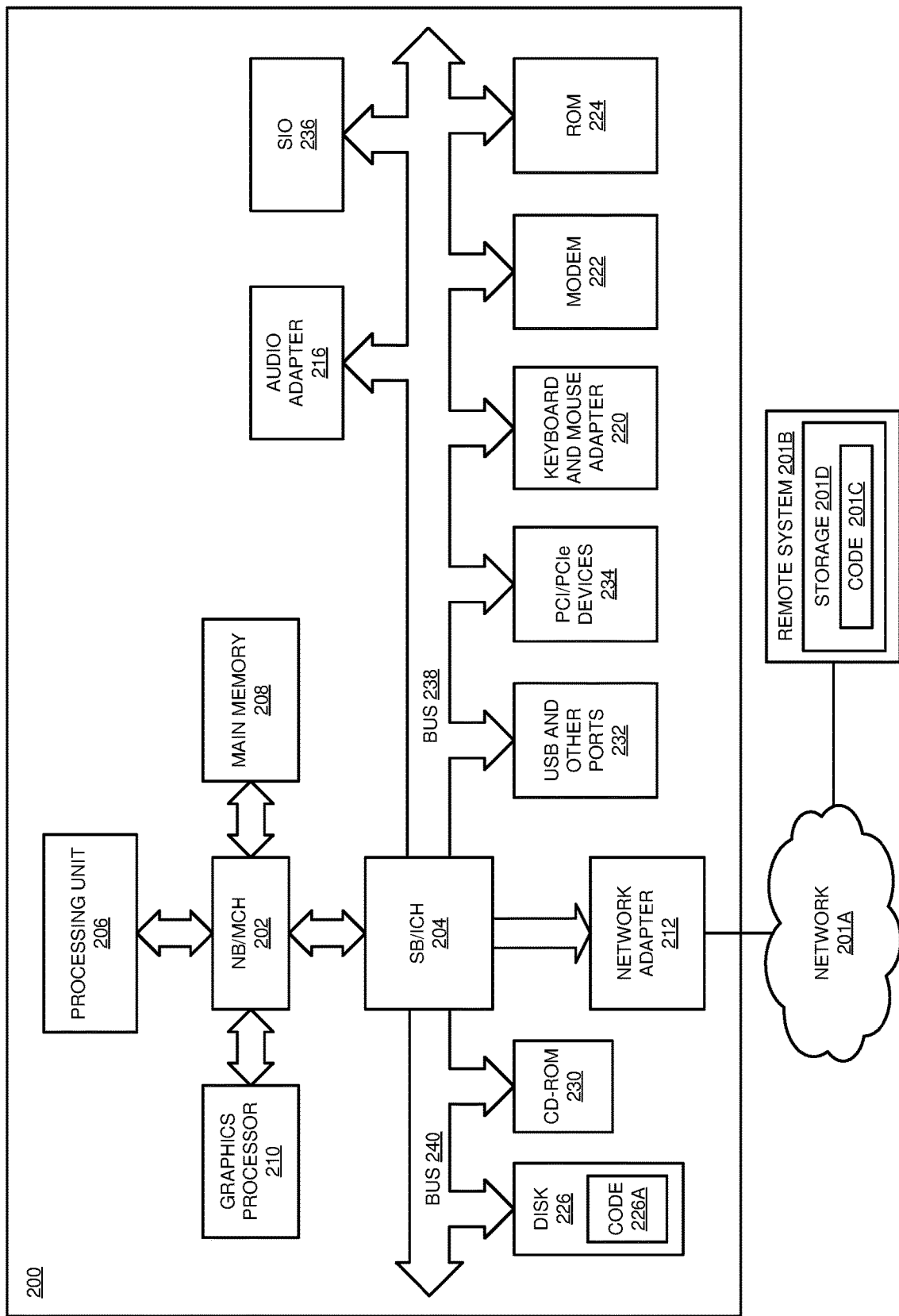
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown. Server 104 includes an application 105 that may be configured to implement one or more of the functions described herein for dynamic modification of a user skill profile using determined crowdsourced social presence in accordance with one or more embodiments.

Server 106 includes a social media platform 107 configured to allow users to post content to groups an interact with other users using social media system and applications as described herein with respect to various embodiments. Storage device 108 includes one or more databases 109 configured to store data such as user skill profile documents (e.g., a resume or CV).

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or usergenerated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
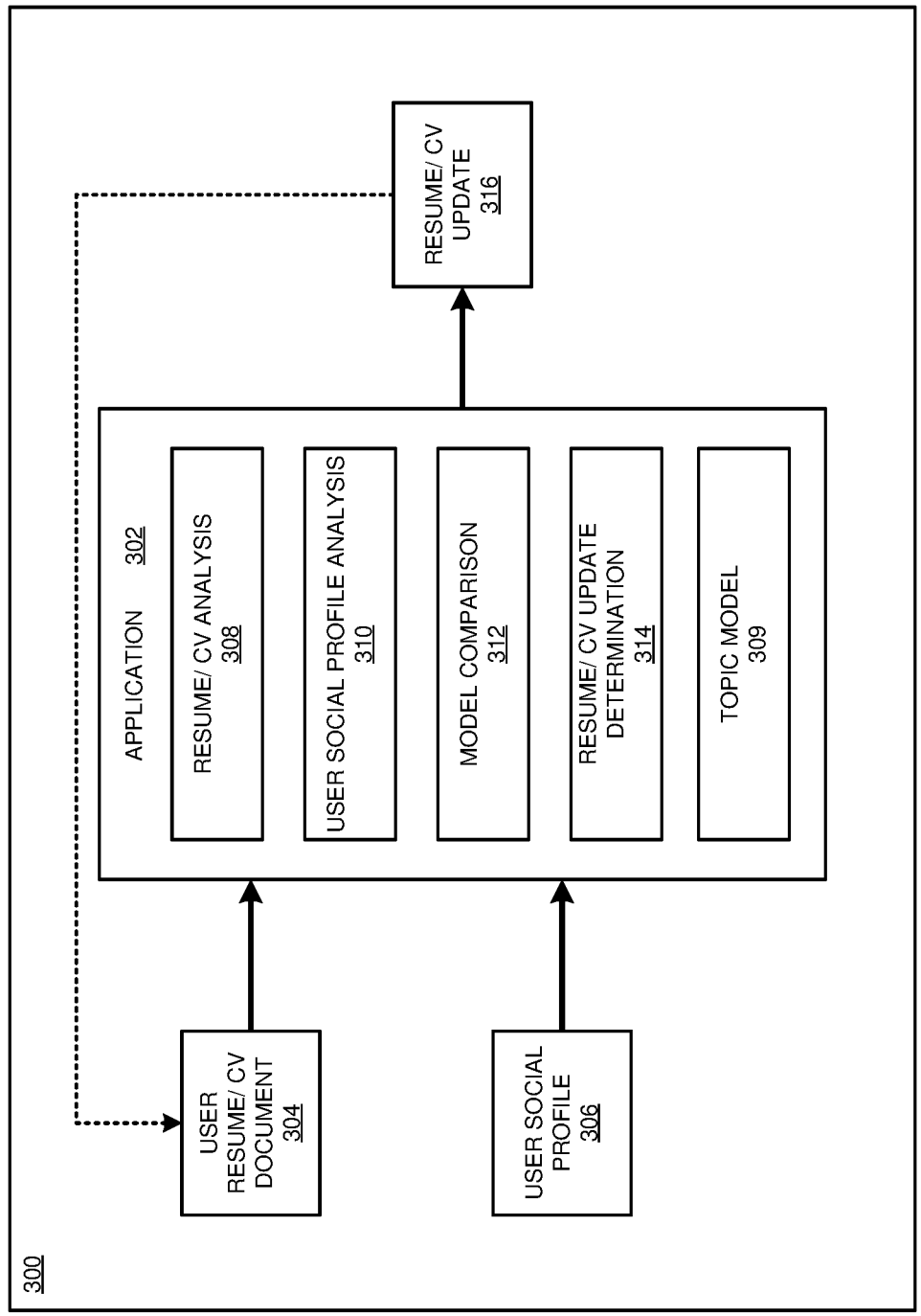
FIG. 3 depicts a block diagram of an example configuration for dynamic modification of a user skill profile using determined crowdsourced social presence in accordance with an illustrative embodiment.

With reference to FIG. 3, this figure depicts a block diagram of an example configuration 300 for dynamic modification of a user skill profile using determined crowd-sourced social presence in accordance with an illustrative embodiment. The example embodiment includes an application 302. In a particular embodiment, application 302 is an example of application 105 of FIG. 1.

Applicant 302 receives a user resume/CV document or other user skills profile document 304 associated with a user. Application 302 further receives a user social profiles 306 indicative of a social presence of the user on one or more social media platforms. Application 302 includes a resume/CV analysis component 308 configured to analyzing resume/CV to determine a topic model 309 of the core skills and competencies of the user as described herein. Application 302 further includes a user social profile analysis component 310 configured to analyze the user's social profile to derive a model of the user's skills and competencies obtained from the user's social profile as described herein. Application 302 further includes a model comparison component 312 configured to compare the topic model and the skills and competencies model to determine discrepancies or differences between the models, and a resume/CV update determination component 314 to determine a resume/CV update 316 based upon the determined differences to reflect new skills and competencies indicated by the social profile but not currently contained with the user's skill profile as described herein. In one or more embodiments, application 302 updates the user resume/CV document 304 based upon the resume/CV update 316 to include the new skills and/or competencies.

Figure 4:
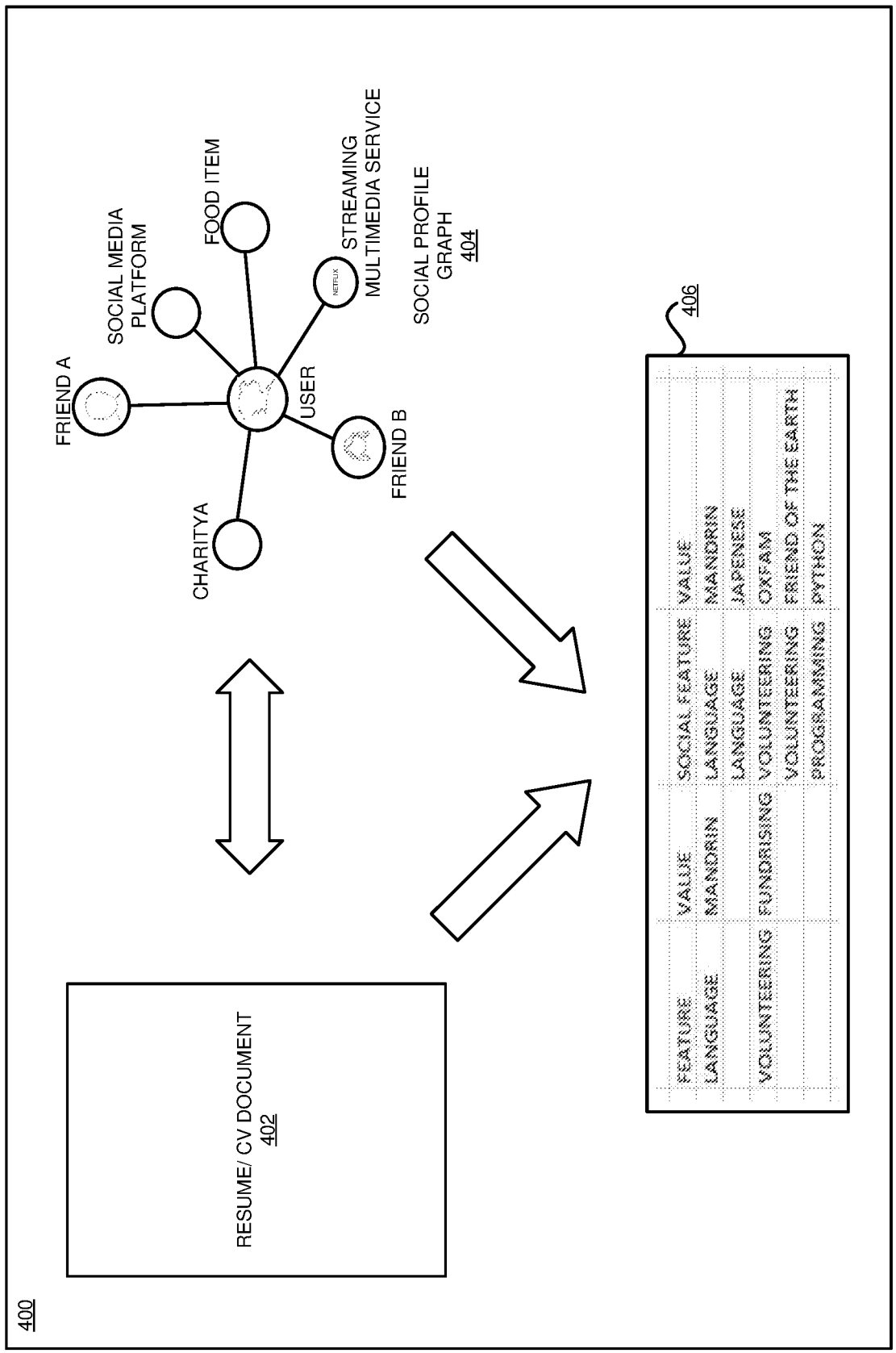
FIG. 4 depicts an example dynamic modification of a user skill profile sequence in accordance with an illustrative embodiment.

With reference to FIG. 4, this figure depicts an example dynamic modification of a user skill profile sequence 400 in accordance with an illustrative embodiment. In block 402, application 105 receives a resume/CV document 402 and a social profile graph 404 associated with a particular user. Resume/CV document 402 describes core skills and competencies of the user, and social profile graph 404 representative of a social network of the user. In the particular example of FIG. 4, social profile graph 404 depicts that the user has a friend relationship with a Friend A and a Friend B, and donates to a Charity A. In the example, the user posts comments to a social media platform, cooks a particular food item, and watches movies on a streaming multimedia service. In the embodiment, application 105 analyzes resume/CV document 402 to determine a model of the core skills and competencies of the user, and analyzes social profile graph 404 to derive a model of the current user's skills and competencies obtained from the user's social profile.

In the embodiment of FIG. 4, a table 406 shows model features and values of example skills and competencies obtained from resume/CB document 402 and social profile graph 404. In the embodiment, application 105 compares the two models to determine discrepancies or differences between the models. In the example of FIG. 4, the model of resume/CV document 402 includes a feature of "LANGUAGE" with a corresponding value of "MANDRIN" representing that the user is skilled in the Mandarin language, and a feature of "VOLUNTEERING" with a corresponding value "FUNDRAISING" indicating that the user is skilled in fundraising. The model of social profile graph 404 includes a social feature of "LANGUAGE" with a corresponding value of "MANDRIN" representing that the user's social profile indicates that the user skilled in the Mandarin language, a social feature of "LANGUAGE" with a corresponding value of "JAPANESE" representing that the user's social profile indicates that the user skilled in the Japanese language.

The model of social profile graph 404 further includes a social feature of "VOLUNTEERING" with corresponding values of "OXFAM" and "FRIEND OF THE EARTH" representing that the user's social profile indicates that the user has experience in volunteering for the Oxfam International and Friend of the Earth charities. The model of social profile graph 404 further includes a social feature of "PROGRAMMING" having a corresponding value of "Python" representing that the user's social profile indicates that the user has skill in the Python programming language.

Accordingly, the user's skill in, for example, the Japanese language and Python programming language is not currently reflected in resume/CV document 402. In the embodiment, application 105 updates resume/CV document 402 to include the missing skills and competencies of the Japanese language and Python programming language.

Figure 5:
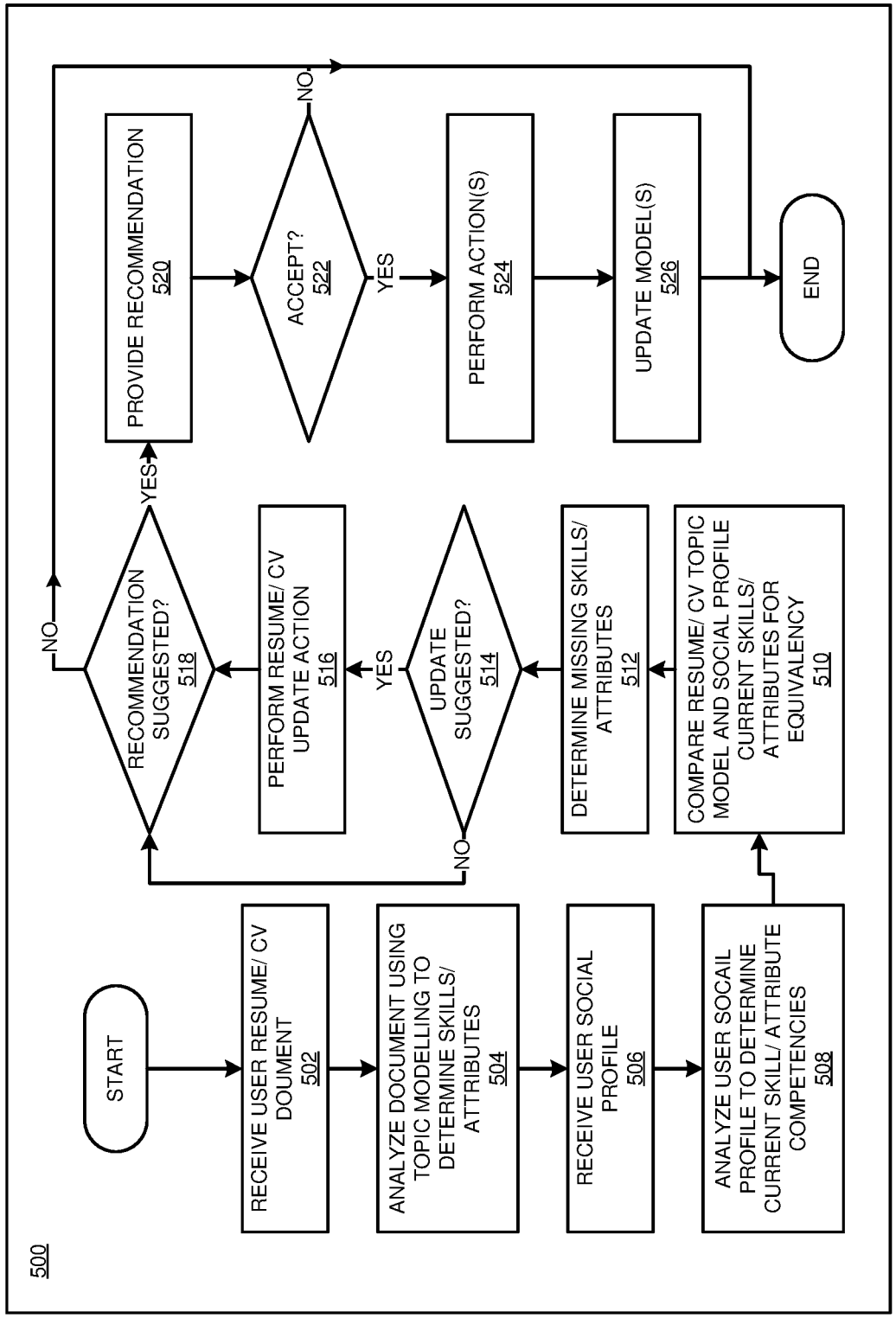
FIG. 5 depicts a flowchart of an example process for dynamic modification of a user skill profile using determined crowdsourced social presence in accordance with an illustrative embodiment.

With reference to FIG. 5, this figure depicts a flowchart of an example process 500 for dynamic modification of a user skill profile using determined crowdsourced social presence in accordance with an illustrative embodiment. In block 502, application 105 receives a user resume/CV document or other user skills profile document. In block 504, application 105 analyzes the resume/CV document using topic modelling algorithm to determine skills and attributes indicated within the resume/CV document. In one or more embodiments, the application performs topic modelling using natural language processing. In a particular embodiment, the topic-modelling algorithm is an LDA algorithm. In one or more embodiments, an unsupervised learning algorithm in used to perform topic modelling on the user skill profile document to group terms within the document by most likely occurrence.

In block 506, application 105 receives a user social profile associated with the user from one or more social media platforms. In block 508, application 105 analyzes the user social profile and user profiles of individuals associated with the user on the one or more social media platforms to determine current skills/attribute competencies of the user using a social profile topic model. In one or more embodiments, the application derives a social graph of the user, determines social graph attributes of the social graph, and determines current skills and competencies of the user based upon the social graph attributes. Social graph attributes represent skills and/or competencies derived from relationships and interactions with the user and other individuals or groups represented in the social graph. Examples of social graph attributes may include, for example, content of posts made by the user, a language known by the user, an activity of the user, and/or an organization associated with the user.

In block 510, application 105 compares the resume/CV document topic model and the social graph skills/attributes model for equivalency. In block 512, application 105 determines social graph skills/attributes that are missing or incomplete from the resume/CV document. In a particular embodiment, the application compares maximum likelihood terms of the resume/CB document topic model with the social profile topic model to determine the missing skills/attributes.

In one or more embodiments, application 105 determines the missing skills/attributes using model divergence. In a particular embodiment, application 105 uses a KL divergence algorithm to measure divergence of a probability distribution of the first model based upon the user skills profile document from a probability distribution of the second model based upon the user's social media presence. In a particular embodiment, the KL divergence is calculated as a log difference between the probability distribution of data in the first model with the probability distribution of data in the second model.

In block 514, application 105 determines whether an update of the resume/CV document is suggested based upon the missing skills/attributes. In a particular embodiment, application 105 determines to update of the resume/CV document if a model divergence between the resume/CV model and social profile model is greater than a first threshold value and less than a second threshold value. If application 105 determines that an update is suggested, in block 516, application 105 performs a resume/CV update action by modifying the resume/CV document to include the missing skills/attributes and process 500 continues to block 518. In a particular embodiment, the application is configured to push minor changes to an online repository including the user's skill profile using an application programming interface (API) associated with the social media platform. If no update is suggested, process 500 continues to block 518.

In block 518, application 105 determines whether a user recommendation is suggested. In a particular embodiment, application 105 determines that a user recommendation is suggested if the model divergence is greater than the second threshold value. If no recommendation is suggested, process 500 ends. If a recommendation is suggested, in block 520 application 105 provides a user recommendation to the user to perform one or more remedial actions. In a particular embodiment, the suggested remedial action includes upgrading of a particular skill or competency via further instruction. In another particular embodiment, the application 105 may recommend to the user to apply for a new employment opportunity for which the user may be suited.

In block 522, application 105 determines whether the user recommendation has been accepted by the user. If the user recommendation has not been accepted, process 500 ends. If the user recommendation has been accepted, in block 524 the user performs one or more of the suggested remedial actions. In block 526, application 105 updates one or more of the resume/CV document topic model and the social graph skills/attributes model based upon the performing of the one or more remedial actions and process 500 ends.

Thus, a computer implemented method, system or apparatus, and computer program product are provided in the illustrative embodiments for dynamic modification of a user skill profile using determined crowdsourced social presence and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for modification of a user skill profile based upon social presence, comprising:
  receiving, by a processor, a document, the document indicating skill competencies of a user;
  analyzing, by the processor performing an unsupervised learning algorithm using a topic modelling algorithm, the document determine a first model, the first model includes skill competencies indicated within the document;
  receiving, by the processor, a social media profile associated with the user;
  analyzing, by the processor, the social media profile by deriving a social graph of the user including determining social graph attributes of the graph to determine a second model, the second model including current skills competencies of the user indicated by the social graph attributes;
  training, by the processor using model divergence sampling data, a supervised learning algorithm to classify pairs of topic models according to divergence, wherein the training results in a trained supervised learning algorithm;
  comparing, by the processor, the first model and the second model using the trained supervised learning algorithm to classify the divergence of the first probability distribution from the second probability distribution to determine missing skill competencies, the missing skill competencies including current skill competencies in the second model that are missing from the document;
  modifying, by the processor automatically responsive to determining that the divergence associated with the missing skill competencies is greater than a first threshold value and less than a second threshold value, the document to include the missing skill competencies;

providing, by the processor automatically responsive to determining that the divergence associated with the missing skill competencies is greater than the second threshold value, a user recommendation to the user to perform a remedial action including updating the document to include the missing skill competencies; and modifying, by the processor automatically responsive to acceptance by the user of the user recommendation, the document to include the missing skill competencies.

2. The method of claim 1, wherein analyzing the document to determine the first model includes using natural language processing.

3. The method of claim 1, wherein analyzing the document to determine the first model includes using a latent Dirichlet allocation (LDA) algorithm.

4. The method of claim 1, wherein the social media profile is received from a social media platform.

5. The method of claim 1, wherein the social graph attributes represent skills and/or competencies derived from relationships or interactions of the user with entities represented in the social graph.

6. The method of claim 1, wherein determining the missing skill competencies includes comparing maximum likelihood terms of the first model and the second model.

7. The method of claim 1, further comprising:
provide a recommendation to the user perform a remedial action based upon the comparison.

8. A computer usable program product comprising one or more computer-readable storage devices, and program instructions stored on at least one of the one or more storage devices, the stored program instructions comprising:

program instructions to receive, by a processor, a document, the document indicating skill competencies of a user;

program instructions to analyze, by the processor performing an unsupervised learning algorithm using a topic modelling algorithm, the document to determine a first model, the first model includes skill competencies indicated within the document;

program instructions to receive, by the processor, a social media profile associated with the user;

program instructions to analyze, by the processor, the social media profile by deriving a social graph of the user including determining social graph attributes of the graph to determine a second model, the second model including current skills competencies of the user indicated by the social graph attributes;

program instructions to train, by the processor using model divergence sampling data, a supervised learning algorithm to classify pairs of topic models according to divergence, wherein the training results in a trained supervised learning algorithm;

program instructions to compare, by the processor, the first model and the second model using the trained supervised learning algorithm to classify the divergence of the first probability distribution from the second probability distribution to determine missing skill competencies, the missing skill competencies including current skill competencies in the second model that are missing from the document;

program instructions to modify, by the processor automatically responsive to determining that the divergence associated with the missing skill competencies is greater than a first threshold value and less than a second threshold value, the document to include the missing skill competencies;

program instructions to provide, by the processor automatically responsive to determining that the divergence associated with the missing skill competencies is greater than the second threshold value, a user recommendation to the user to perform a remedial action including updating the document to include the missing skill competencies; and program instructions to modify, by the processor automatically responsive to acceptance by the user of the user recommendation, the document to include the missing skill competencies.

9. The computer usable program product of claim 8, wherein analyzing the document to determine the first model includes using natural language processing.

10. The computer usable program product of claim 8, wherein analyzing the document to determine the first model includes using a latent Dirichlet allocation (LDA) algorithm.

11. The computer usable program product of claim 8, wherein the social media profile is received from a social media platform.

12. The computer usable program product of claim 8, wherein the social graph attributes represent skills and/or competencies derived from relationships or interactions of the user with entities represented in the social graph.

13. The computer usable program product of claim 8, wherein determining the missing skill competencies includes comparing maximum likelihood terms of the first model and the second model.

14. The computer usable program product of claim 8, wherein the computer usable code is stored in a computer readable storage device in a data processing system, and wherein the computer usable code is transferred over a network from a remote data processing system.

15. The computer usable program product of claim 8, wherein the computer usable code is stored in a computer readable storage device in a server data processing system, and wherein the computer usable code is downloaded over a network to a remote data processing system for use in a computer readable storage device associated with the remote data processing system.

16. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to receive, by a processor, a document, the document indicating skill competencies of a user;

program instructions to analyze, by the processor performing an unsupervised learning algorithm using a topic modelling algorithm, the document to determine a first model, the first model includes skill competencies indicated within the document;

program instructions to receive, by the processor, a social media profile associated with the user;

program instructions to analyze, by the processor, the social media profile by deriving a social graph of the user including determining social graph attributes of the graph to determine a second model, the second model including current skills competencies of the user indicated by the social graph attributes;

program instructions to train, by the processor using model divergence sampling data, a supervised learning algorithm to classify pairs of topic models according to divergence, wherein the training results in a trained supervised learning algorithm;

program instructions to compare, by the processor, the first model and the second model using the trained supervised learning algorithm to classify the divergence of the first probability distribution from the second probability distribution to determine missing skill competencies, the missing skill competencies including current skill competencies in the second model that are missing from the document;

program instructions to modify, by the processor automatically responsive to determining that the divergence associated with the missing skill competencies is greater than a first threshold value and less than a second threshold value, the document to include the missing skill competencies;

program instructions to provide, by the processor automatically responsive to determining that the divergence associated with the missing skill competencies is greater than the second threshold value, a user recommendation to the user to perform a remedial action including updating the document to include the missing skill competencies; and program instructions to modify, by the processor automatically responsive to acceptance by the user of the user recommendation, the document to include the missing skill competencies.

* * * * *